(12) United States Patent
Paonessa et al.

(10) Patent No.: US 6,439,283 B1
(45) Date of Patent: Aug. 27, 2002

(54) RUNFLAT TIRE WITH TREAD STIFFENING MEMBER

(75) Inventors: Anthony Curtis Paonessa, Akron; Mark Henry Seloover, Clinton; Steven Craig Roweder, Uniontown; Walter Dale Allen, Cuyahoga Falls, all of OH (US); John Janes Beck, Jr., Lawton, OK (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/424,520

(22) PCT Filed: May 22, 1998

(86) PCT No.: PCT/US98/10550
§ 371 (c)(1),
(2), (4) Date: Jul. 18, 2000

(87) PCT Pub. No.: WO98/54014
PCT Pub. Date: Dec. 3, 1998

Related U.S. Application Data

(63) Continuation-in-part of application No. 08/865,448, filed on May 29, 1997, now Pat. No. 6,026,878, and a continuation-in-part of application No. 08/865,489, filed on May 29, 1997, now Pat. No. 5,871,600, and a continuation-in-part of application No. 08/865,490, filed on May 29, 1997, now Pat. No. 5,871,602, and a continuation-in-part of application No. PCT/US98/05189, filed on Mar. 13, 1998.

(51) Int. Cl.[7] ............................. B60C 9/18; B60C 9/20; B60C 9/22; B60C 11/00; B60C 17/00

(52) U.S. Cl. ............... 152/200; 152/209.1; 152/209.18; 152/517; 152/526; 152/527; 152/531; 152/532; 152/533; 152/534; 152/546; 152/DIG. 19

(58) Field of Search .................................. 152/517, 531, 152/533–535, 527, 526, 198, 200, 209.1, 532, 546, DIG. 19, 209.18

(56) References Cited

U.S. PATENT DOCUMENTS

| 4,111,249 A | | 9/1978 | Markow |
| 4,989,658 A | | 2/1991 | Maathuis et al. |
| 5,368,082 A | * | 11/1994 | Oare et al. .................. 152/517 |
| 5,427,166 A | | 6/1995 | Willard, Jr. |
| 5,637,163 A | | 6/1997 | Kobayashi |
| 5,647,928 A | | 7/1997 | Umezawa |
| 5,653,829 A | | 8/1997 | Gettys et al. |
| 5,660,654 A | | 8/1997 | Miyazaki |
| 5,685,927 A | | 11/1997 | Hammond et al. |
| 5,711,829 A | | 1/1998 | Pollard et al. |
| 5,871,601 A | | 2/1999 | Tsuda |

FOREIGN PATENT DOCUMENTS

| EP | 605 177 A1 | 7/1994 |
| EP | 0 729 853 A1 | 9/1996 |
| EP | 822105 A2 | 2/1998 |
| FR | 2 287 350 | 5/1976 |
| FR | 2 425 334 | 12/1979 |
| FR | 2 460 218 | 1/1981 |
| WO | WO97/01452 | 1/1997 |

* cited by examiner

Primary Examiner—Adrienne C. Johnstone
(74) Attorney, Agent, or Firm—David L. King

(57) ABSTRACT

A runflat pneumatic tire has a tread stiffening member radially inward of the tread 12. The tire has a deflected section height $H_{30}$ under load at 30 psi inflation and a deflected section height $H_0$ at 0 psi wherein the deflection $D_{30}$ are equal to or less than $D_0-D_{30}$ and the net contact area at 0 psi has a perimeter dynamic contact shape of at least U shaped or rectangular.

17 Claims, 17 Drawing Sheets

AMENDED SHEET

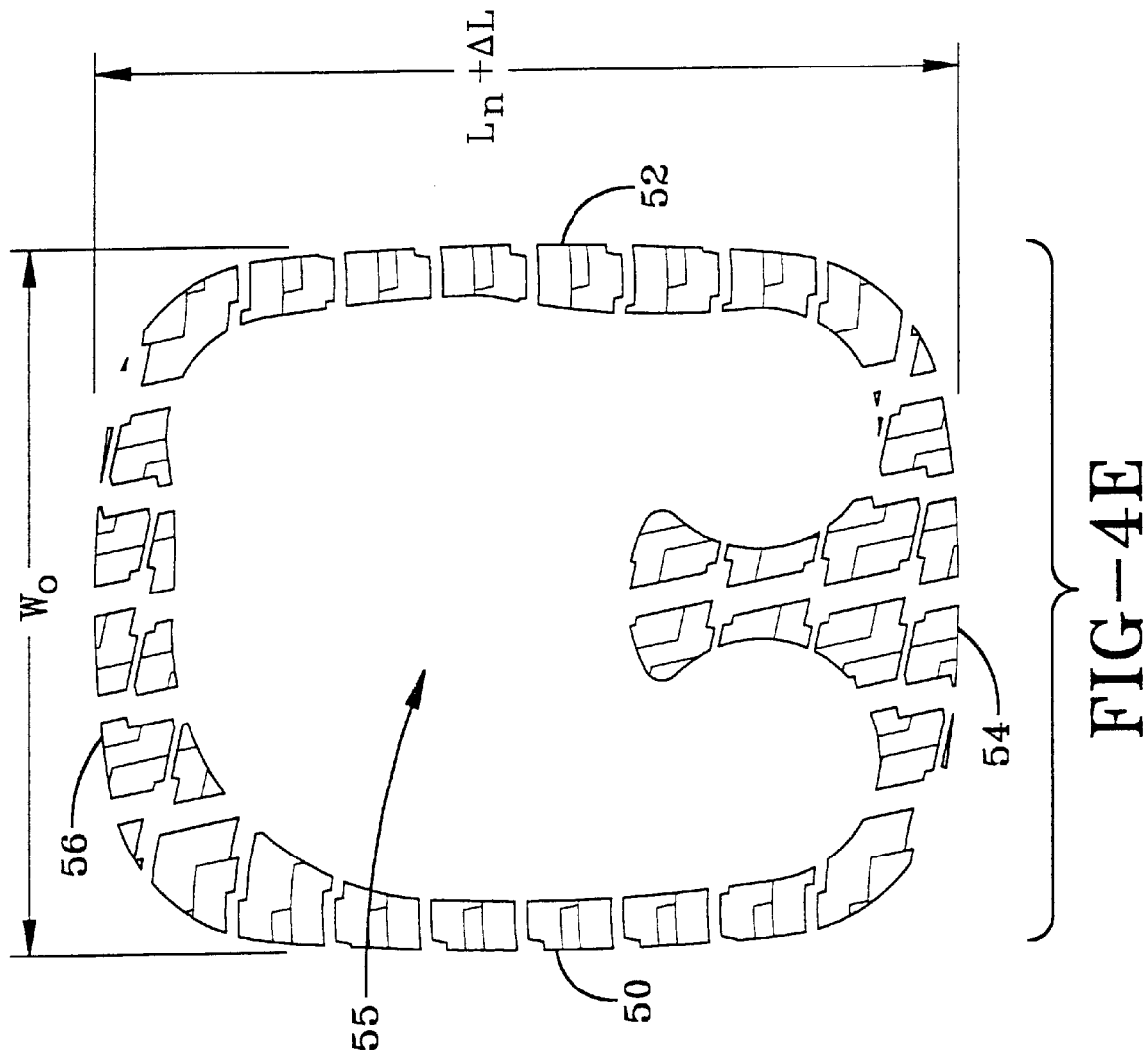

RUNFLAT TIRE WITH TREAD STIFFENING MEMBER

This application is a 371 national stage application of PCT/US98/10550 filed May 22, 1998, and is a continuation-in-part of application Ser. No. 08/865,448 filed May 29, 1997, now U.S. Pat. 6,026,878, and is also a continuation-in-part of application Ser. No. 08/865,489 filed May 29, 1997, now U.S. Pat. 5,871,600, and is also a continuation-in-part of application Ser. No. 08/865,490 filed May 29, 1997, now U.S. Pat. 5,871,602, and is also a continuation-in-part of PCT/US98/05189 filed Mar. 13, 1998.

TECHNICAL FIELD

This invention relates to a tire; more particularly to a pneumatic tire capable of being used in the uninflated condition.

BACKGROUND ART

Various tire constructions have been suggested for pneumatic runflat tires, that is, tires capable of being used in the uninflated condition. One approach described in U.S. Pat. No. 4,111,249 entitled "Banded Tires" was to provide a hoop or annular band directed under and approximately as wide as the tread. The hoop in combination with the rest of the tire structure could support the vehicle weight in the uninflated condition. This banded tire actually tensioned the ply cords even in the uninflated condition. Another U.S. Pat. No. 5,685,927; combined the use of sidewall inserts in combination with an annular bead placed directly under the tread. In this approach, the sidewall inserts were assisted in load carrying capacity by the addition of this tread bead. The resultant tire was able to carry more load with less sidewall material. Unfortunately, the hoop or beads under the tread created additional rolling resistance problems and presented a much stiffer tread area which could inhibit ride performance.

In a 1998 article entitled "Self-Supporting Tire Performance Criteria in Testing", the author Walter Lee Willard, Jr. of Michelin America Research and Development corporation, reported to the Society of Automotive Engineers, Inc. a rather comprehensive study of self-supporting tires. He reported that self-supporting tires share the same basic design objectives: minimize the differences relative to conventional tires (inflated), enhance low pressure handling capability, acceptable zero PSI handling on suitable vehicles, enhance low pressure and zero PSI bead retention; and provide sufficient zero PSI durability to avoid a less than ideal roadside situation.

It is applicants' belief that the ideal self-supporting or runflat tires is one that can operate at zero PSI indefinitely and this theoretical tire should provide the same ride performance and handling characteristics of the pneumatic tire. Having set that, as a design goal, current technology falls far short in several areas, however, it is improving rapidly. In order to approach the theoretical goal, applicants have discovered several unique relationship with regard to runflat tires, and in discovering these relationships, they have developed several embodiments that have improved characteristics and are a great step forward in the achievement of the theoretical runflat tire.

SUMMARY OF THE INVENTION

A pneumatic runflat tire 1, 2, 3, 4, 5 or 6 having a radially outer tread 12, a belt reinforcing structure radially inward of the tread, the belt reinforcing structure having at least two cord reinforced layers 24, 26, and a carcass reinforcing structure including at least one cord reinforced ply 30, 32 extending to a pair of annular beads 36a, 36b is disclosed. The tire when mounted on a design rim when normally inflated but unloaded has a section height (H), a section width W, wherein W is greater than (H). The tire has a pair of sidewalls 16, 18 extending from the tread 12 radially inward toward the bead cores 36a, 36b. Each sidewall 16, 18 has at least one elastomeric filler 40a, 40b, 42a, 42b radially inward of the ply 30, 32. The normally inflated 30 PSI deflection $D_{30}$ of the tire when under normal vehicle load is less than 20 mms. The zero PSI deflection $D_0$ under normal load is less than 40 mms. The difference between the vehicle loaded uninflated deflection $D_0$ minus the $D_{30}$ deflection is substantially equal to or less than the amount of deflection $D_{30}$.

The tire 1, 2, 3, 4, 5 and 6 when mounted on a design rim and normally inflated and placed under normal vehicle load, has a dynamic tread contact patch 55 at 4 kph or greater characterized by a substantially rectangular shape having a width $W_n$ and a average circumferential length $L_n$ and a length $L_n+\Delta L$ and width $W_0$; wherein $W_0$ is less the 120% of $W_n$ when under normal vehicle load and zero inflation pressure. The contact patch 55 has a parimeter shape wherein at least the leading edge 54 and preferably some or all the trailing edge 56 maintains tread element contact in the range of inflation pressures from zero to normal inflation pressure. The ratio of the contact patch length $L_n+\Delta L$ at zero PSI to the length $L_n$ is 225 percent or less. The tire 1, 2, 3, 4, 5 and 6 has a net contact area when normally vehicle loaded and inflated that is less than 150 percent of the normally vehicle loaded and zero PSI net contact area, preferably less than 125%, most preferably the same contact area.

The pneumatic runflat tires achieving this deflection at 30 PSI and zero PSI and the footprint contact shape are defined by a combination of composite structures which include the tread 12, the belt reinforcing structure 24, 26 and the at least one cord reinforced ply 30, 32 and one or more tread stiffening members 101 selected from a group of one or more of the following: a) a fabric overlay 28 having at least three layers of cord reinforced material located between the tread 12 and the belt reinforcing structure 24, 26, b) at least three or more annular bands 29 positioned in an array laterally across the tire 4 interposed between the belt reinforcing structure 24, 26 and the carcass ply 30, 32, the array of bands 29 having axial width at least 70 percent of the tread width, c) one or more layers of elastomeric spacers 27 —one layer located between two belt layers 24, 25, 26 or a belt layer 26 and a carcass ply 30, 32, d) a third belt layer 25 having steel cords inclined in a range of 18° to 30° relative to the tires equatorial plane, e) a third belt layer 25 having cords in a range of 50° to 80° relative to the equatorial plane and located between the belt structure and the carcass ply, f) one or more fabric underply layers 70 located between the belt reinforcing structure 24, 26 and the carcass reinforcing structure 30, 32, g) one or more helically wound coils 60 extending circumferentially around and radially inward of the belt reinforcing structure 24, 26, the combination of elements forming a composite structure yielding the contact patch 55 at normal inflation and zero PSI whereby the tread elements maintain at least parimeter contact around the contact patch 55, at both shoulder regions 50, 52 and the leading edge 54, preferably at both shoulder regions 50, 52, and leading edge 55 and trailing edge 56.

The tire 1, 2, 3, 4, 5 or 6 when employing one or more of the stiffening members 101 described above achieves the desired zero PSI driving and handling performance without sacrificing the tire's ride and handling at normal inflation pressures.

A preferred embodiment tire 1 includes a fabric overlay 28 interposed between the tread 12 and the belt reinforcing structure 24, 26, the fabric overlay 28 being made of three or more spirally wound layers of aramid reinforced strips. The cords of the fabric overlay 28 are oriented at an angle θ of less than 5° relative to an equatorial plane of the tire 1. The fabric overlay 28 is preferably composed of strips which are spirally wound about the tire, its spiral revolution having a pitch of about 25 mm or less. In tires 1 having an aspect ratio greater than 50% the strips overlap sufficiently to create at least three layers of overlay fabric 28 across the entire width of the overlay 28. In tires 1 having an aspect ratio of less than 50% the strips are overlapped in three layers in at least the central region and the shoulder regions, the three layers covering at least 60% of the overlay width.

Another embodiment tire 2 according to the invention has a belt reinforcing structure having three belt layers 24, 25, 26, each belt layer 24, 25, 26 having parallel cords oriented angularly relative to the equatorial plane of the tire 2 in the range of 18° to 30°; each adjacent layer being oppositely inclined relative to another layer. In the preferred second embodiment tire 2, each belt layer is similarly but oppositely inclined. The cords of one or more belt layers are steel and have a diameter of 0.035 inches and a 2+2 construction. Alternatively, the cords of one or more belt layers can be made of steel having a diameter of 0.056 inches. The second embodiment tire 2 described above further may include a fabric overlay 28, the overlay 28 having two layers of preferably aramid reinforced cords, preferably the cords are applied and spirally wound strips. Alternatively, the three-belt layer tire may have one belt larger 24, 25, or 26 having cords oriented at 50° to 90° relative to the equatorial plane. The tread stiffening member 101 in the third through fifth embodiment, tires 3, 4, 5, 6 include three or more resilient bands 29, a helically wound coil 60 and elastomeric spacer layers 27, and a fabric underply respectively.

Definitions

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers, the bead or beads under the tread being encapsulated in tread rubber can be with or without other cord reinforced fabric elements.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Normal Vehicle Load" means the estimated load for a given tire at a predetermined vehicle specified pressure. For this application, all testing was conducted at 900 lbs. load at 30 psi, 0 psi unless otherwise indicated for a 215/65R15 sized tire.

"Ply" means a continuous layer of rubber-coated parallel cords.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

BRIEF DESCRIPTION OF DRAWINGS

The structure, operation, and advantages of the invention will become further apparent upon consideration of the following description taken in conjunction with the accompanying drawings, wherein:

FIG. 4E is he schematic dynamic contact patch 55 of the tire of FIG. 4C constructed with an aspect ratio of 65% when uninflated and normally loaded.

Figure 11:
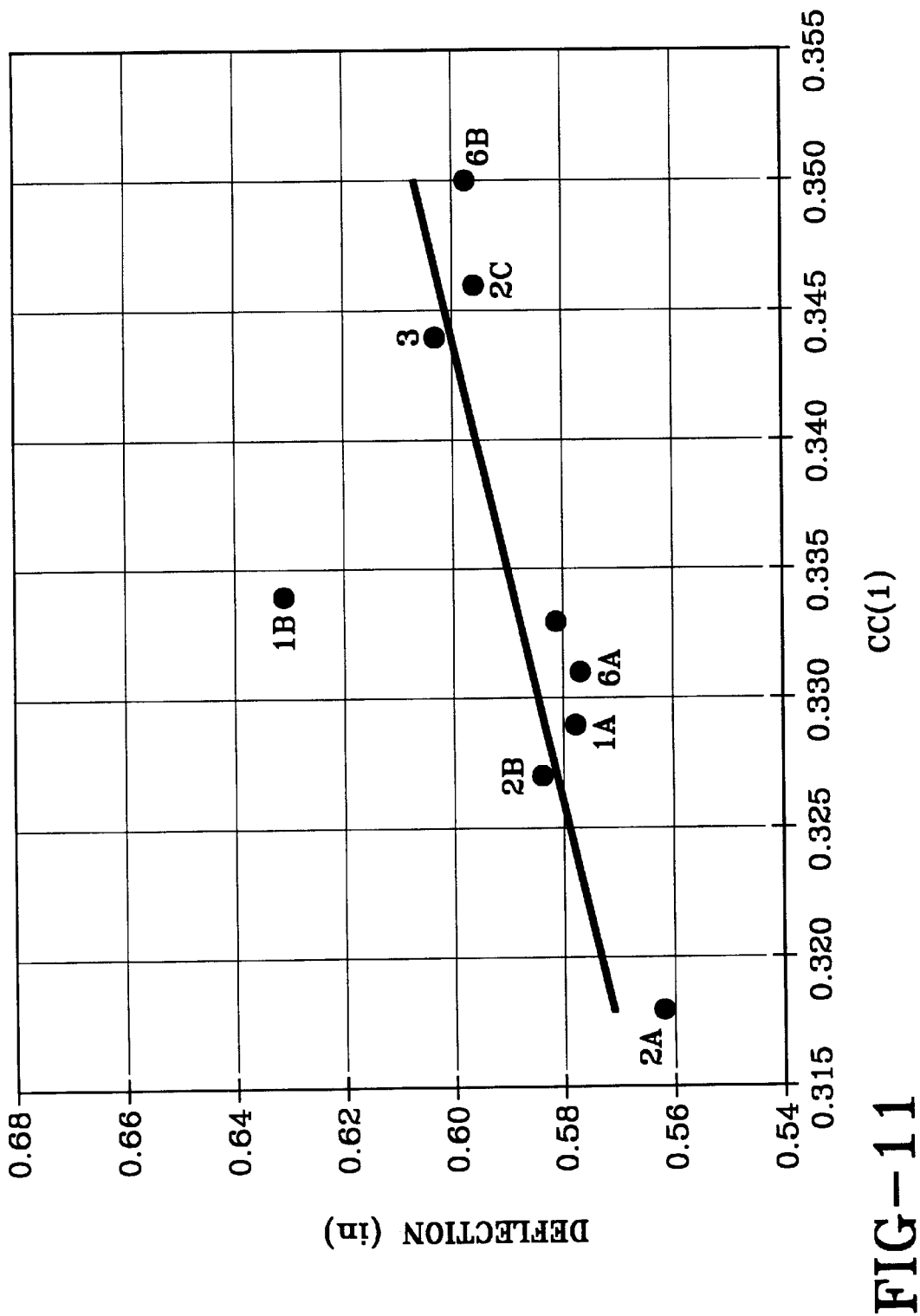
Figure 12:
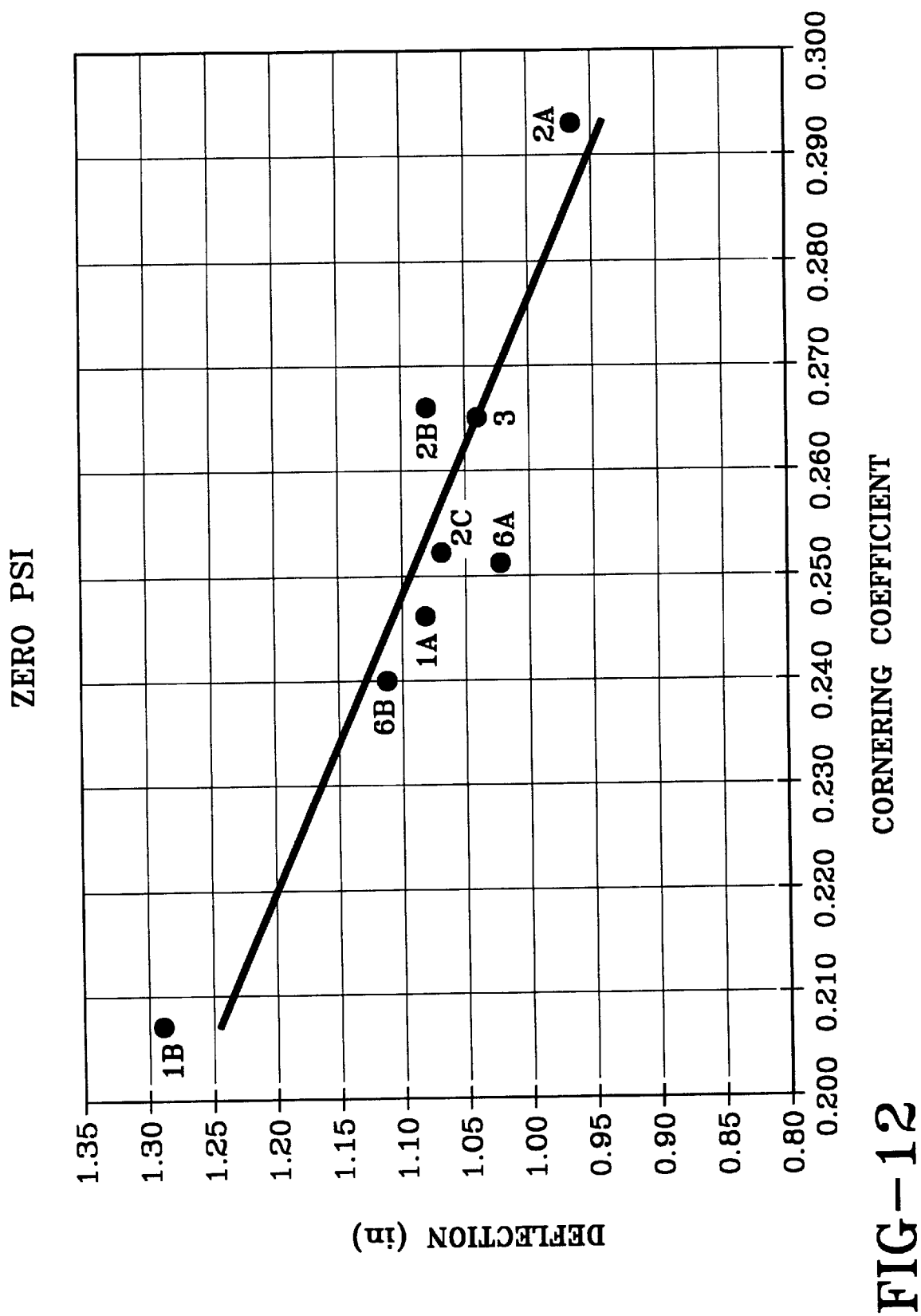
Figure 13:
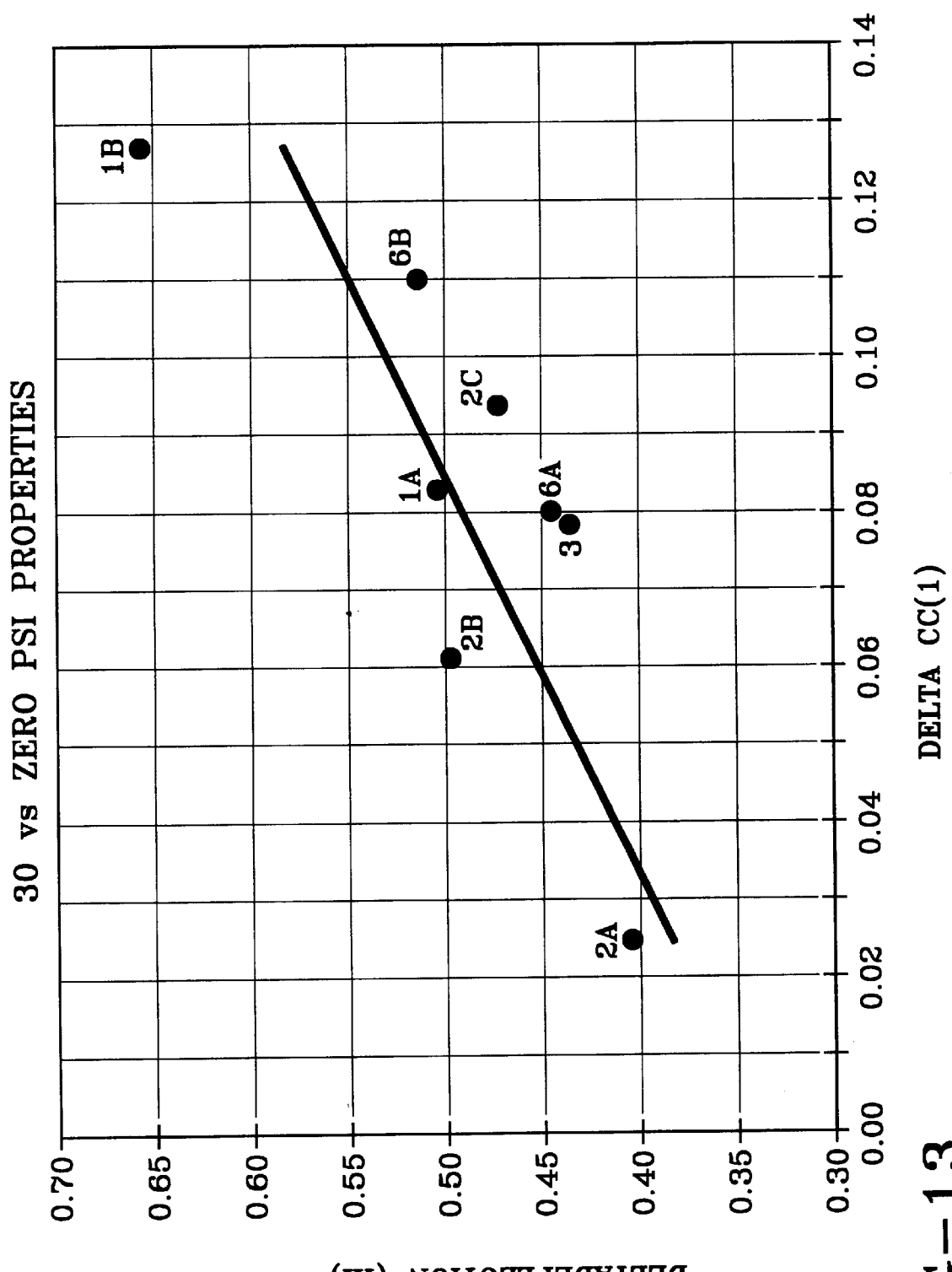

The charts of FIGS. 11, 12, and 13 shows the deflection versus cornering coefficient cc at 4000 N (normal vehicle load) at 32 psi inflation, at 0 psi inflation and the change in deflection versus change in cornering coefficient at 32 psi versus 0 psi respectively.

DETAILED DESCRIPTION OF THE PREFERRED EMBODIMENT

Prior Art Embodiment

Figure 1:
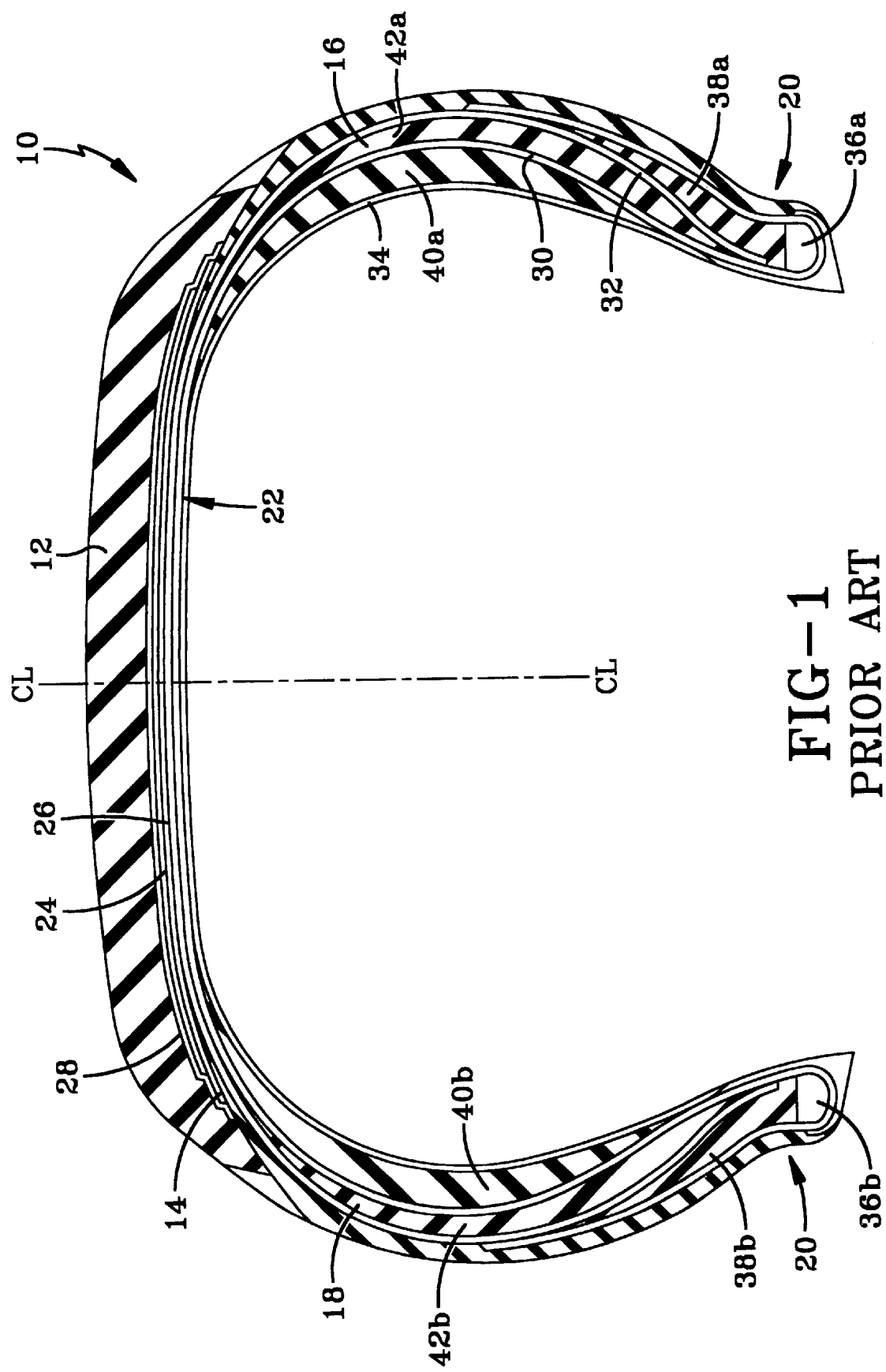
FIG. 1 is a cross-sectional view of a prior art runflat tire 10 incorporating runflat insert-reinforced sidewalls.

With reference to FIG. 1, a cross-section of a typical prior art low-profile pneumatic radial runflat tire 10 is illustrated. The tire 10 has a tread 12, a belt structure 14, a pair of sidewall portions 16, 18, a pair of bead regions 20 and a carcass structure 22. Belt structure 14 consists of two belts 24, 26 and a fabric overlay 28 deployed between the bottom portion of tread 12 and the upper parts of the belt structure. The carcass 22 includes a first ply 30 and a second ply 32, a gas-impervious inner liner 34, a pair of beads 36a, 36b, a pair of bead filler apexes 38a, 38b, a first pair of inserts 40a, 40b, and a second pair of inserts 42a, 42b. The first or innermost insert 40a, 40b is located between the innerliner 34 and the first ply 30 and second ply 32. Fabric overlay 2 is disposed beneath, or radially inward of, tread 12 and on top of, or radially outward from, belt structure 14. The reinforced sidewall portions 16, 18 of carcass structure 22 give the tire 10 a limited runflat capability.

As can be seen from FIG. 1, the structural reinforcement in the sidewall area of the tire 10 substantially increases the overall thickness of the sidewall portions 16, 18. This generalized prior art runflat tire design shows the mote or less uniformly thickened sidewalls that characterize runflat tire designs. Such insert-reinforced sidewalls are necessary to support the tire's load with minimal sidewall deformation when the tire 10 is in an uninflated state. Such runflat tire designs provide reasonable vehicle handling and performance under conditions of full inflation, and they yield reasonable runflat tire life and vehicle handling when the tire is uninflated. Runflat tires generally weigh more than equivalent non-runflat-capable tires, because of the additional weight of the reinforcement material in the sidewalls; this additional weight is greater in high-profile runflat tires than in low-profile runflat tires.

Figure 2A:
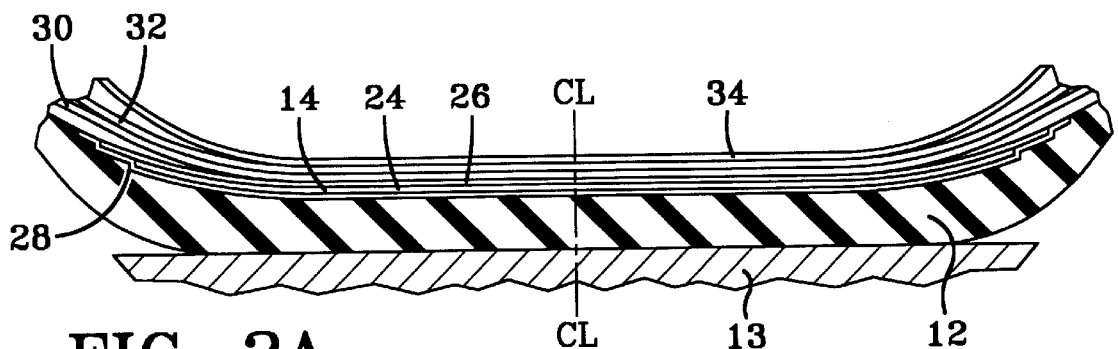
FIG. 2A is a fragmentary cross-sectional schematic view of the ground-contacting portion of the prior art runflat tire 10 of FIG. 1 in normally inflated condition.

FIG. 2A shows a fragmentary schematic of a normally inflated prior art tire with its tread 12 in contact with the ground 13. The flattening of the tread 12, in the region where it contacts the ground 13, induces bending stresses in the tread and its underlying components, including belt structure 14, overlay fabric 28, belts 24, 26, radial plies 30, 32, and inner liner 34. More specifically, the bending stresses derive from the flattening of the tread 12 from the as-molded or the as-inflated lateral curvature of tread and its underlying structures. These bending stresses induce tensile stresses in the radially inward structures beneath tread 12, such as the innerliner 34 and the radial plies 30, 32. Corresponding compressive stresses are induced in the elastomeric material of tread 12 and such underlying structures as the fabric overlay 28 and portions of the belt structure 14.

Figure 2B:
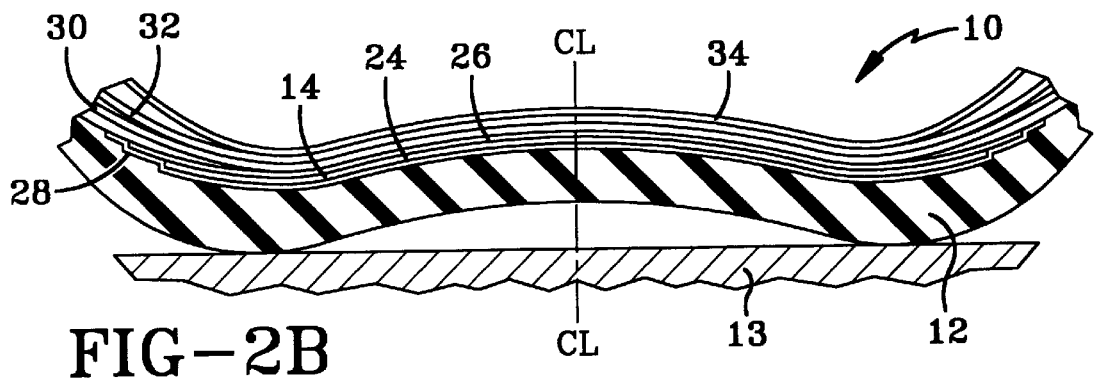
FIG. 2B is a fragmentary cross-sectional schematic view of the ground-contacting portion of the prior art runflat tire 10 of FIG. 1 in an uninflated condition.

FIG. 2B illustrates the upward buckling of tread 12 of the uninflated prior art runflat tire 10 in the region where the load-bearing tread contacts the flat road surface 13. The upward buckling of the central tread region corresponds to the formation of bending stresses in the central portions of tread 12 and its underlying structures. The bending stresses in the tread 12 during runflat operation, as illustrated in FIG. 2B, are greater than those associated with simple flattening of the tread during normal-inflated operation, as illustrated in FIG. 2A.

Figure 2C:
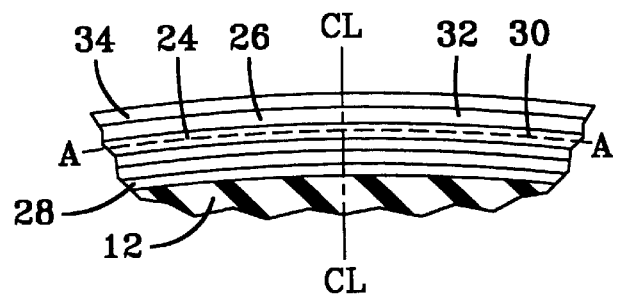
FIG. 2C is an enlarged fragmentary schematic view of the upward-buckled central portion of the uninflated prior art tire shown in FIG. 2B.

FIG. 2C is a fragmentary schematic detail (not in exact proportion) of the belts 24, 26, plies 30, 32, innerliner 34 and fabric overlay 28 as they would appear within the upward-buckled central portion of the tread 12 of the prior art tire. The neutral bending axis A—A shown in FIG. 2C is shown located in a plausible relationship with respect to the fabric overlay 28, belts 24, 26, plies 30, 32 and innerliner 34. Those skilled in the art will appreciate that, in FIG. 2C, the structural elements of tread 12 which lie above the neutral axis A—A—i.e., radially inward of the tread 12—will experience tensile loading, while those structures located below the neutral axis A—A, i.e., closer to tread 12, will experience compressive loading. The location of neutral axis A—A in relation to belts 24, 26 is approximate, taking into account the tensile-stress- bearing capabilities of radial plies 30, 32 and the compressive-stress-bearing structure, nor is the innerliner 34 an effective tensile-load-bearing structure. The neutral axis A—A is shown to be located within belt 24 purely as an approximation of where it would lie given the relative greater modulus of elasticity of the steel cords in belts 24, 26 compared to the modulus of the cords that reinforce the plies 30, 32. It is recognized that greater or lesser degrees of upward buckling of the central portions of the tread 12, as illustrated in FIGS. 2B and 2C, plausibly will cause the location to the neutral bending axis A—A to change correspondingly with regard to the tire's radial direction.

Figure 3A:
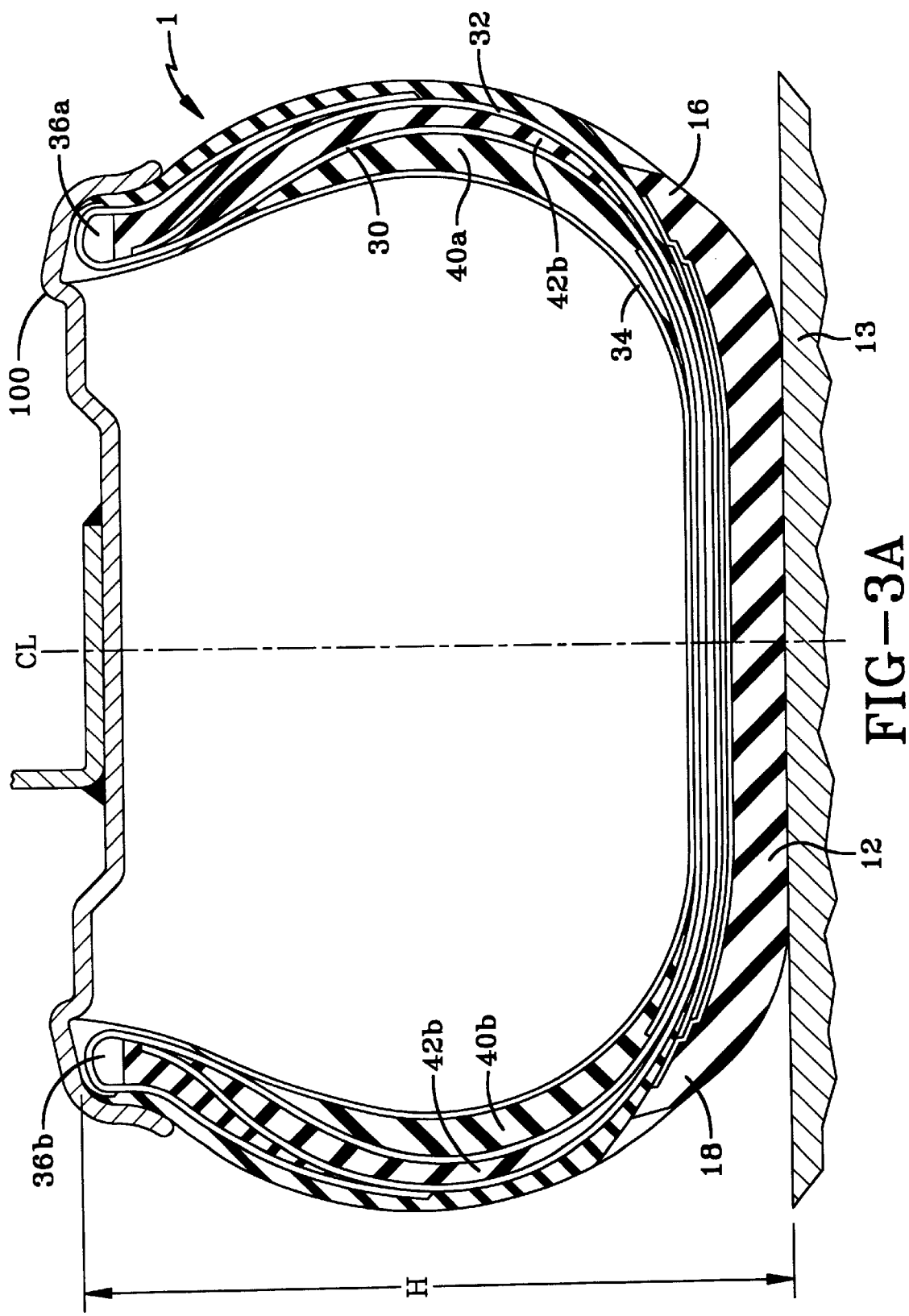
FIG. 3A is a cross-sectional view of an exemplary runflat tire 1 according to the invention. The tire 1 being shown in the normally inflated mounted on its design rim 100 but unloaded condition.
Figure 3B:
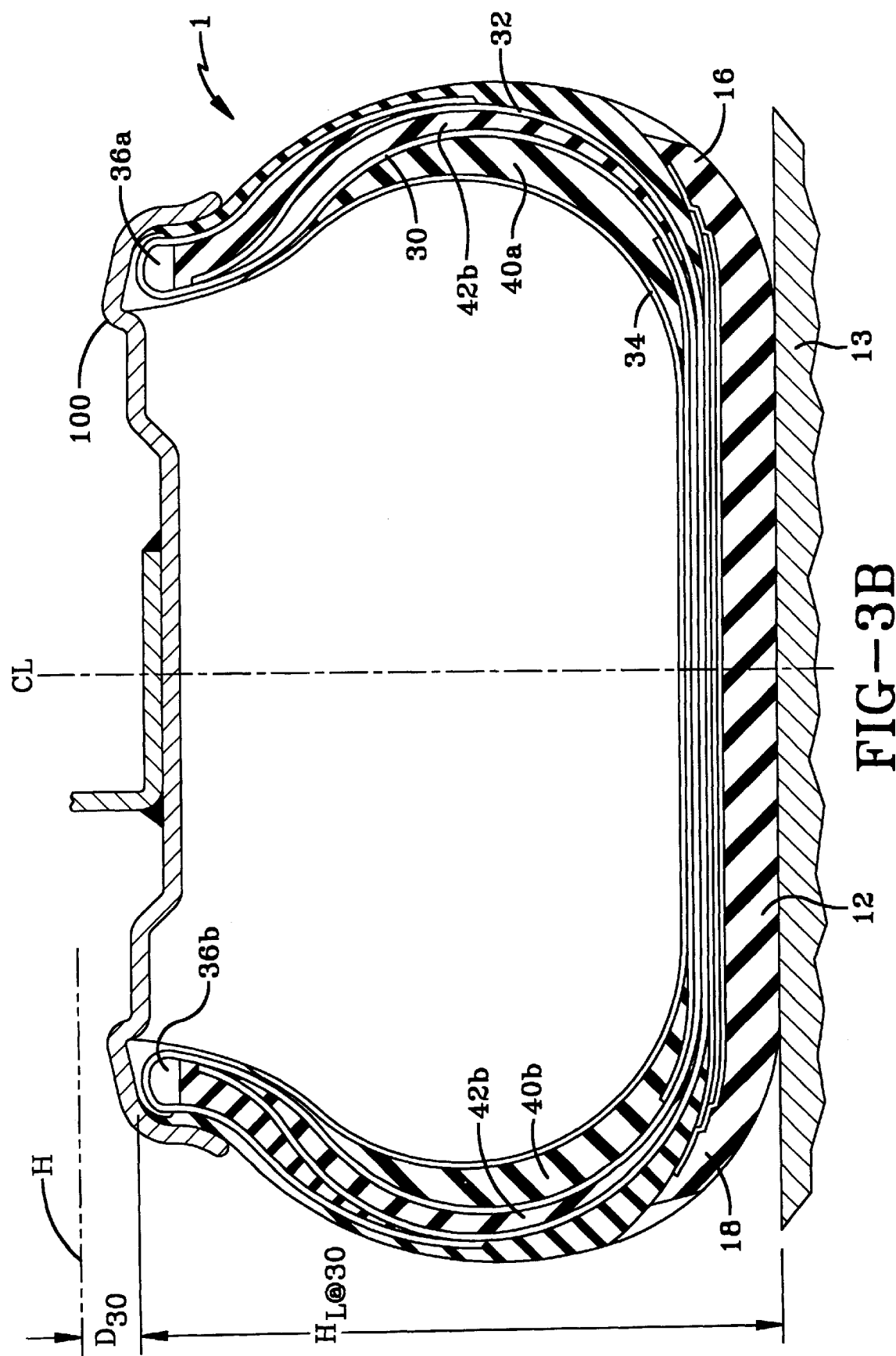
FIG. 3B is the tire 1 of FIG. 3B shown when inflated normally 630 psi (2 bars) and normally vehicle loaded.
Figure 3C:
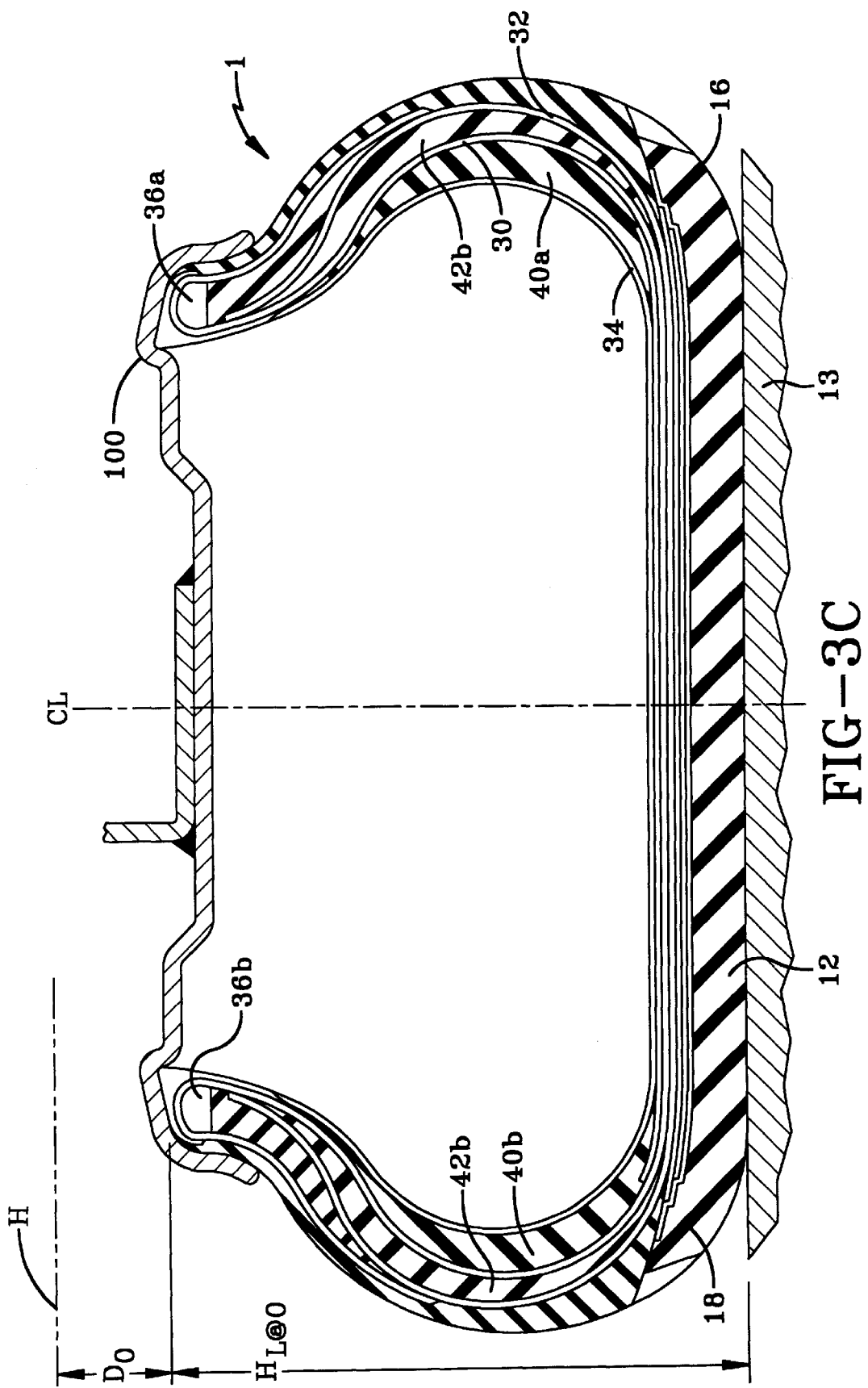
FIG. 3C is the tire 1 of FIG. 3A shown uninflated and normally vehicle loaded. The cross-section being taken along the leading edge 54 of the contact patch 55.

As shown in FIGS. 3A through 3C, tire 1 being illustrated, it being noted that all the various tires 1, 2, 3, 4, 5 and 6 of the present invention have a similar unique deflection profile that is related to the sidewall 16, 18 stiffening working in combination with the tread 12 and its underlying composite reinforcements. In FIG. 3A, a normally inflated exemplary runflat tire 1, according to the invention, is shown in the unloaded condition. The tire exemplary has an undeflected section height at "H" as shown in the figure. As shown in FIG. 3A, when the tire 1 is at its normal inflation of say 30 PSI and loaded to a normal vehicle load of approximately 4,000 Newton, the tire will exhibit a deflection $D_{30}$ as measured from the unloaded section height H, the deflection $D_{30}$ being less than 20 mm. As further shown in FIG. 3C, the tire 1 when uninflated and loaded to 4,000 Newton exhibits a deflection $D_0$ of less than 40 mm. These representative deflections were for a test tire of a size P215/65R15 wherein the load of 4,000 Newton is the typical normal vehicle load. It is believed that as the tire sizes change and the normal vehicle load correspondingly is changed for various tire constructions that this relationship of deflection $D_0$, $D_{30}$ should be maintained. As will be appreciated by those of ordinary skill and tire art, the deflection of the normally inflated and loaded tire $D_{30}$ is relatively a small amount of deflection from the inflated but unloaded tire. By subtracting the normally inflated deflection $D_{30}$, from the total deflection Do of the uninflated tire, one finds that this difference ($D_0$—$D_{30}$) or $\Delta$ deflection is substantially equal to or less than the normally loaded and inflated deflection $D_{30}$. What this means to those of ordinary skill in the art is that the tire section height does not substantially deviate from the inflated $H_{L\theta 30}$ to the uninflated condition $H_{L\theta 0}$. This minimal deflection ($D_0$—$D_{30}$) difference greatly reduces the amount of instability created when one of the tires is run in the uninflated condition. This is particularly noticeably when the tire has a high section height H or is a high aspect ratio tire of greater than 50%, more typical 60% or greater, as is common in mini-vans and sport utility vehicles. The tires generally have a section height of 4 inches (10 cm) or greater.

As was reported in U.S. Pat. No. 5,685,927 the spring rate of the tire in the inflated condition should not change appreciably from that of a conventional non-runflat pneumatic tire. When the runflat tire was operated in the uninflated state, the spring rate must be sufficient to prevent the tire from buckling or collapsing onto itself. The prior art tire of U.S. Pat. No. 4,111,249 with the resilient band had a spring rate approximately one-half the inflated tire spring rate. Otherwise, a severe thumping problem could be evidenced. In U.S. Pat. No. 5,685,927 the tire having a third bead core under the tread, it was determined that the overall spring rate should be in a range of 30 percent to 50 percent of that of the inflated tire. This condition insured that for a given load, the tire would only deflect about 2 to 3 times that of the inflated tire. This increase in deflection reportedly created no significant handling problems at routine highway speeds. While that was true for the three-bead tire, it should be noted that the tire was tested as a P275/40ZR18 high performance runflat tire having an inflated spring rate of approximately 2,000 pounds per inch and in the uninflated conditions the spring rate was 806 pounds per inch. That prior art tire having a very low section height was reasonably stable under those large uninflated deflections. Furthermore, the vehicle was a Corvette which had a compensating suspension system further improving the handling capability of the car when one tire was uninflated.

In the case where these higher aspect ratio tires are developed to run in the uninflated condition, deflections of such a large magnitude and changes in spring rate from the inflated to the uninflated condition dramatically can effect the handling characteristics of the vehicle. It is, therefore, considered prudent to attempt to develop the runflat tire such that variations from the inflated to the uninflated conditions are kept to a minimum.

Figures 4A, 4B:
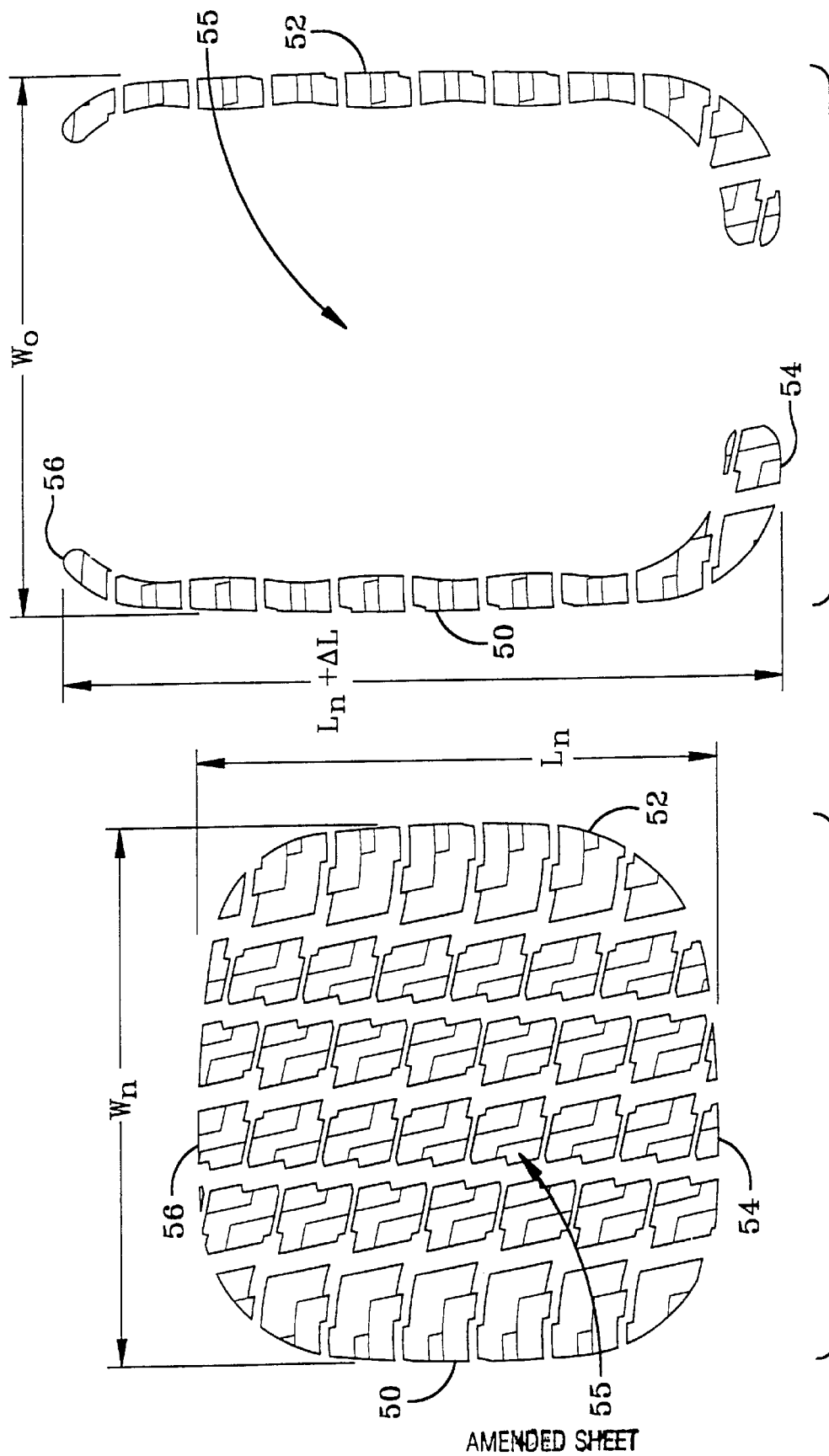
FIG. 4A is a schematic representation of the normally vehicle loaded and inflated dynamic contact patch of a exemplary tread for a runflat tire.
FIG. 4B is a schematic representation of a normally vehicle loaded and uninflated dynamic contact patch of the tire of FIG. 4A using a prior art construction.
Figure 4D:
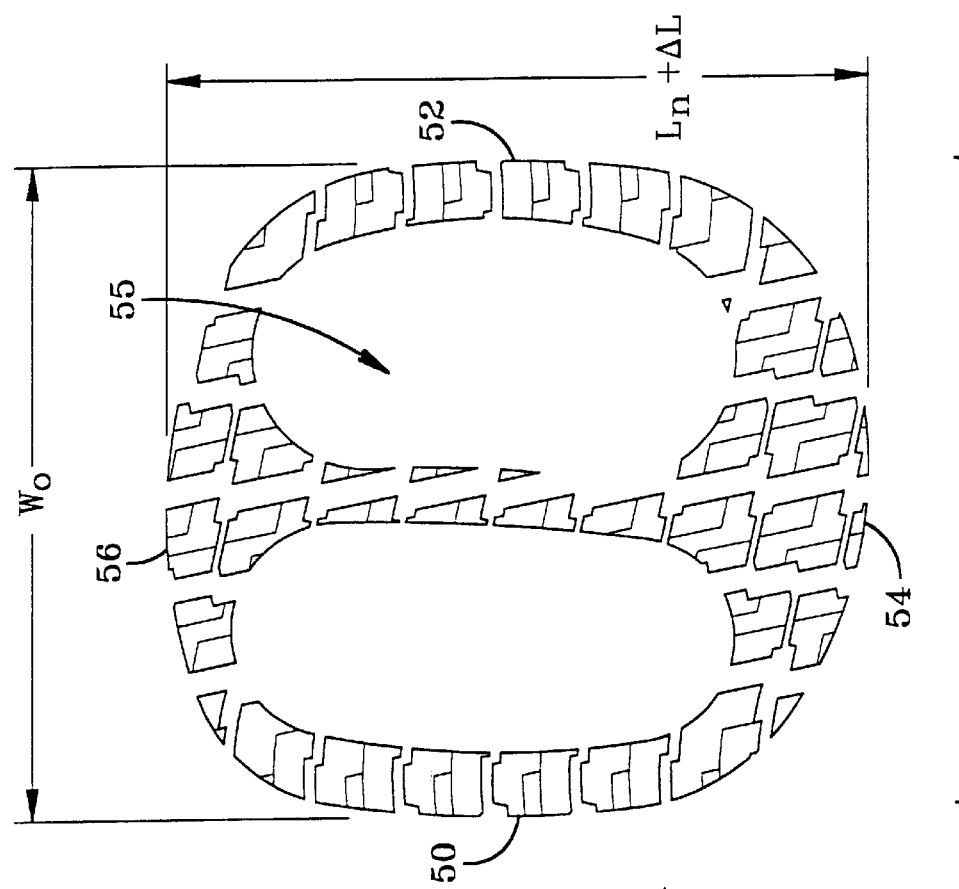
FIG. 4D, is the schematic dynamic contact patch 55 of the tire of FIG. 4C when constructed in an aspect ratio of less 50% only uninflated and normally vehicle loaded.
Figure 4C:
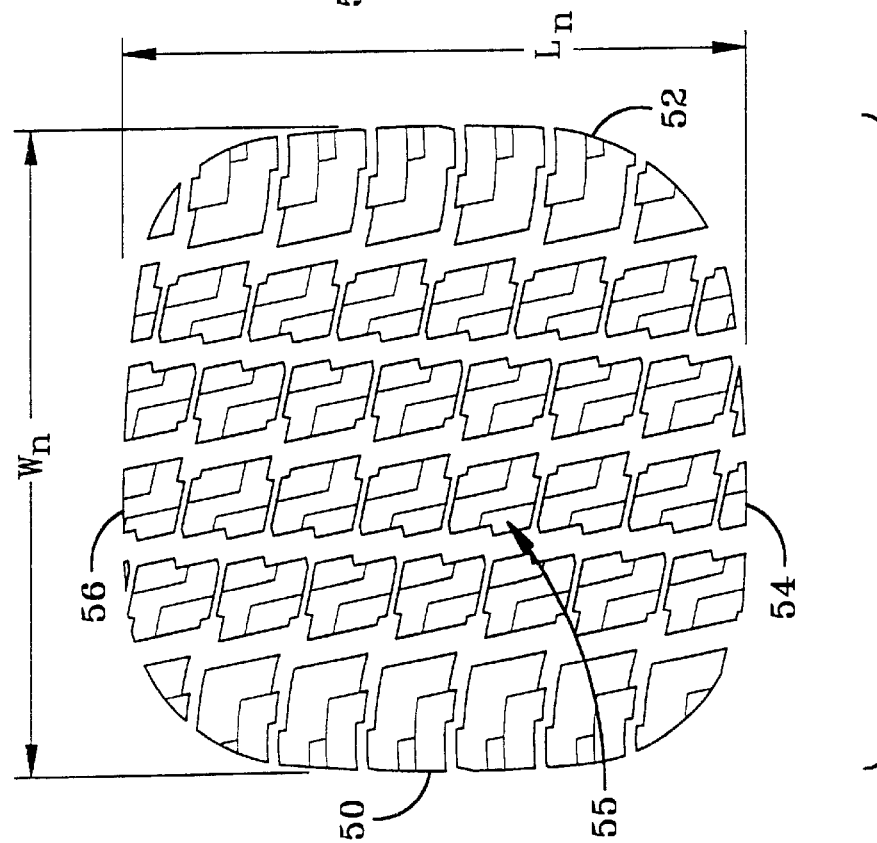
FIG. 4C representation is a schematic of a dynamic contact patch 55 of the exemplary tread of the tires 1, 2, 3, 4, 5 or 6 according to the invention under normal vehicle load and 30 psi (2 bars) inflation.

As can be seen from FIGS. 4A, B, C, D and E, these variations in deflections also effected the tire's contact patch 55 otherwise known as the footprint area. The prior art runflat tires 10 having a higher deflection under the normal vehicle loaded and uninflated conditions exhibited by a lengthening of the tire's contact patch as the tire 10 is uninflated and placed under normal load when compared to the normally vehicle loaded and inflated contact patch of FIG. 4A. Additionally and most importantly this can be observed from FIG. 4B when compared to the contact patch 4A of the normally inflated and normally loaded prior art tire 10. It can be readily appreciated that only the shoulder areas 50, 52 maintain tread element contact creating two contact zones that are substantially not connected. The tread elements in the center region of the tread 12 from leading edge 54 to trailing edge 56 are generally non-contacting. This evidences a severe buckling in the tread region of the runflat tires 10 of the prior art. In FIGS. 4C, the contact patch of the tires 1, 2, 3, 4, 5 and 6 according to the present invention exhibit a relatively rectangular cross-sectional shape in the normally vehicle loaded and 30 psi (2 bar) inflated condition. When the tire according to the invention is uninflated and normally vehicle loaded as in FIG. 4D, the tread elements maintain contact around the parimeter of the footprint along at least the leading edge 54 and the two shoulder regions 50, 52. When the tire is uninflated and loaded to the maximum gross vehicle load, a further deflection occurs but the tread contact patch 55, while becoming longer in the circumferential direction, maintains this parimeter contact around the footprint as shown in FIG. 4E. Therefore, tread element contact is maintained across at least the leading edge 54 and in some cases across the trailing edge 56 of the contact patch on footprint 55. The parimeter contact was at a minimal "U" shaped, and in many cases rectangular, creating a good cornering capability tire at zero psi. These footprints had their dynamic contact patch 55 representations taken at approximately 4 km per hour. At these relatively low speeds, this exaggerates the buckling of the tread 12 in the center region in the uninflated condition. As the tire increases its speed and velocity, the buckling of the center elements is dramatically reduced. Therefore, at higher speeds, more of the tread will be in contact. However, by testing the tire at such a slow speed an exaggerated statement of the non-contact area, can be created. While the optimum condition would be to have the tread elements in the uninflated condition maintain the same contact area as the inflated condition, it can easily be appreciated that the lack of air within the tire's chamber requires that the composite reinforcing structure beneath the tread 12 and the tread 12 work in combination to create contact areas. It is significant that the leading edge 54, and in some cases, some or all of the trailing edge 56 of the tread elements maintain their contact with the road. This effectively evidences that the composite structures radially inward from the tread 12 is working to resist buckling. This is believed to significantly improve the cornering coefficient capability of the tires 1, 2, 3, 4, 5 and 6 when driven in the uninflated condition. After a brief discussion of several of the embodiments 1, 2, 3, 4, 5 and 6 of the tire according to the invention, some charts will be shown showing the various constructions performance characteristics with regard to both the deflection and cornering coefficients.

Figure 5:
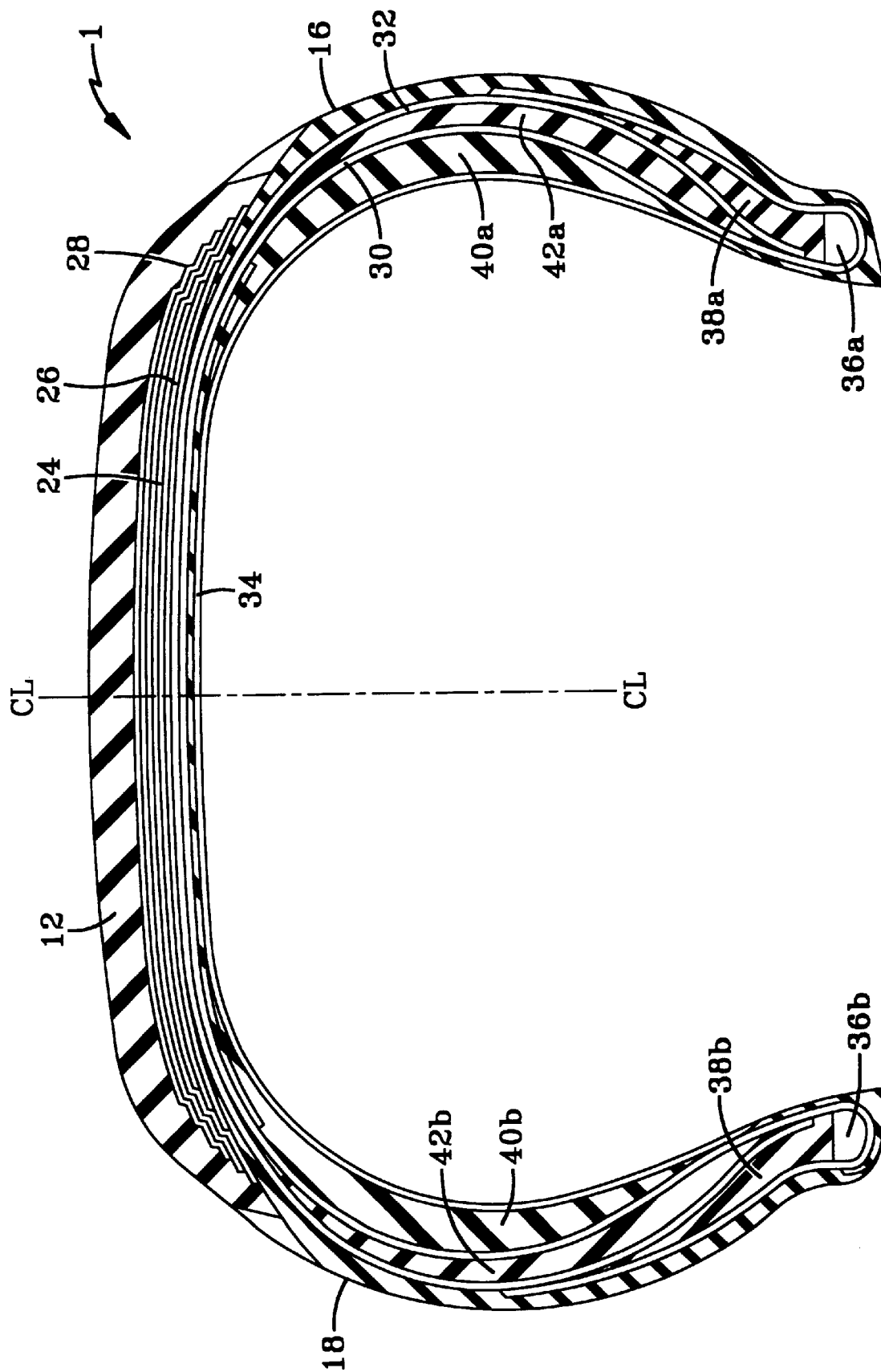
FIG. 5 is a cross-sectional view of a first embodiment tire 1 employing at least three layers of fabric overlay 28.

The first embodiment tire 1 according to the invention is shown in FIG. 5. This first embodiment tire 1 employs three layers of fabric overlay 28 spirally wound across the crown area of the tire covering both belt layers 24, 26. Each fabric layer or overlay is wound spirally and is oriented at an angle of less than 5° relative to an equatorial plane of the tire. Preferably, the spirally wound layers are of aramid cord reinforced strips. The strips being approximately a little greater than 25 mm in width. The strips are spirally wound about the tire during its manufacture such that each spiral revolution around the tire building drum has a pitch of 25 mm or less. This results of strips overlapping sufficiently to create at least three layers of overlay fabric across the entire width of the underlying belt layers 24, 26. It is understood that the sidewall reinforcements as shown in FIG. 5 are similar to the prior art tire earlier discussed with similar components having similar referenced numerals. This is true for each of the respective embodiments which will be discussed later in detail. As can be seen at the lateral extremes of the overlay 28, the ends are slightly staggered to prevent any major discontinuities or stress risers. The combination of the tread 12, the three layers of overlay 28 and the belt reinforcing structures 24, 26 in combination with the reinforcing plies 30, 32 directly under the tread provide a composite structure that acts as a stiffening member 101 between the two sidewalls 16 and 18. It is this stiffening in this region that prevents or limits the tread 12 from buckling when operated in the uninflated condition at the leading and in some cases the trailing edges 54, 55 of the contact patch 55. Most notably when the parimeter is found to be in complete contact across the leading and trailing edges, the tire's aspect ratio has been 50% or less. The amount of overlap and the method of preparing a spiral overlap being overlay as described above is taught in U.S. Pat. 4,989,658 issued Feb. 5, 1991 and will be readily appreciated by those of ordinary skill in the art as a great enhancer of high speed performance in radial and pneumatic tire. In this application, however, the spiral overlay 28 is primarily used to improve runflat performance in terms of handling and cornering coefficients as well as improving the tire's rolling resistance when operated in the inflated position.

Figure 6:
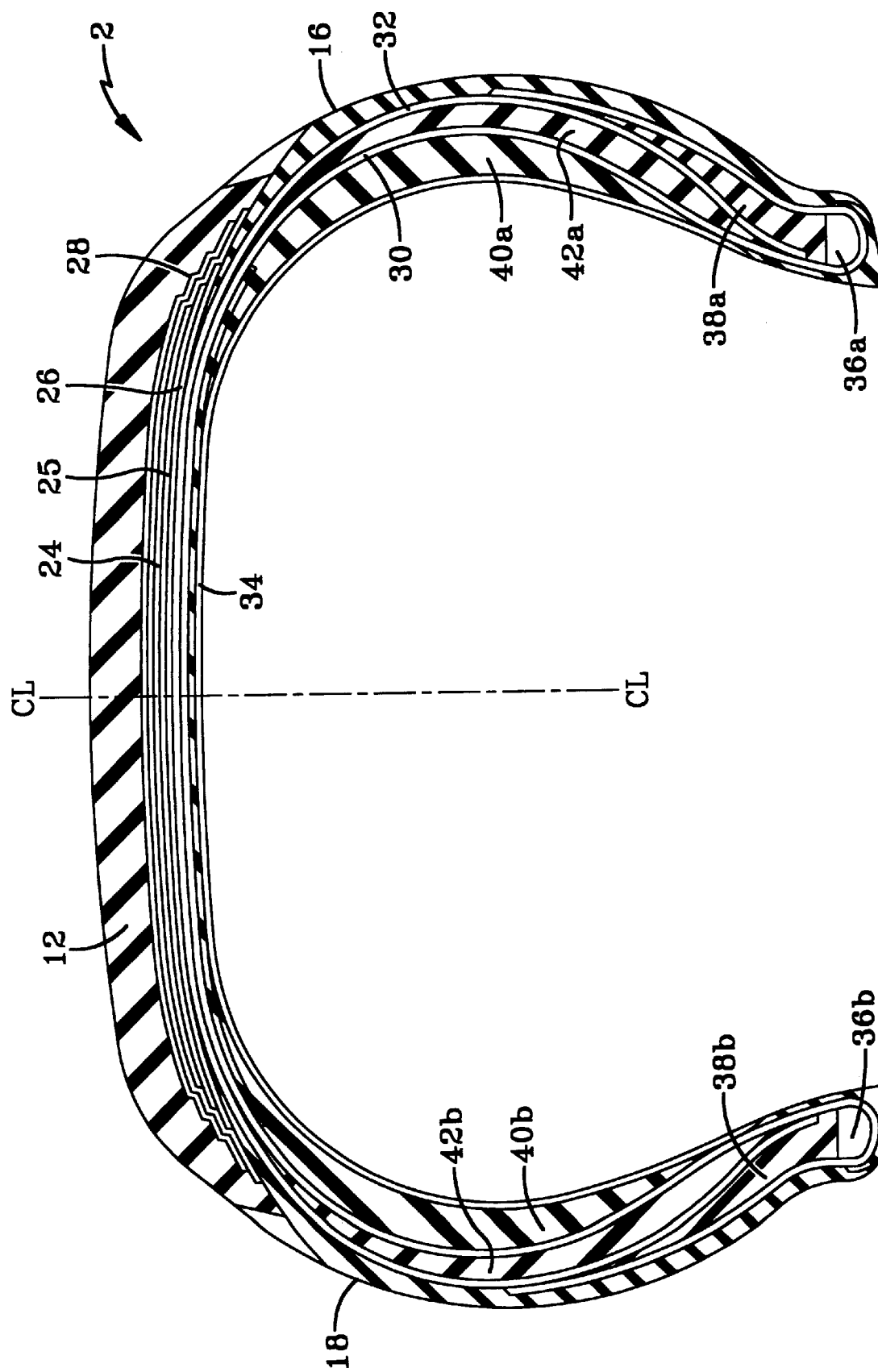
FIG. 6 is a cross-sectional view of a second embodiment tire 2 employing three belt layers 24, 25, 26.

With reference to FIG. 6, a second embodiment tire 2 is shown the second embodiment tire 2 has a belt reinforcing structure comprising three belts 24, 25 and 26. In the preferred embodiment, the tire further includes two layers of fabric overlay 28 as shown the preferred tire has each belt layer 24, 25 and 26 having parallel cords oriented angularly relative to the equatorial plane of the tire. The cords are inclined in the range of 18° to 30°. Each adjacent belt layer has oppositely inclined cords. In the preferred embodiment, each belt has cord angles equal but oppositely inclined. The cords of one or more belt layers are steel which has a diameter of about 0.035 inch and a 2+2 construction. Alternatively, the cords of one or more belt layers are steel and have a cord diameter of about 0.056 inches. In one version of the second embodiment tire, one belt layer has cords in the 50° to 80° range relative to the equatorial plane. It is believed preferable that this third belt structure be adjacent the carcass plies and the most radially inner belt. This effectively creates a transition zone between the radial carcass and the two belt layers. Generally, it is believed desirable that the cords be of steel for maximum increase in the modulus of the composite reinforcing structure radially inward of the tread 12.

Figure 7:
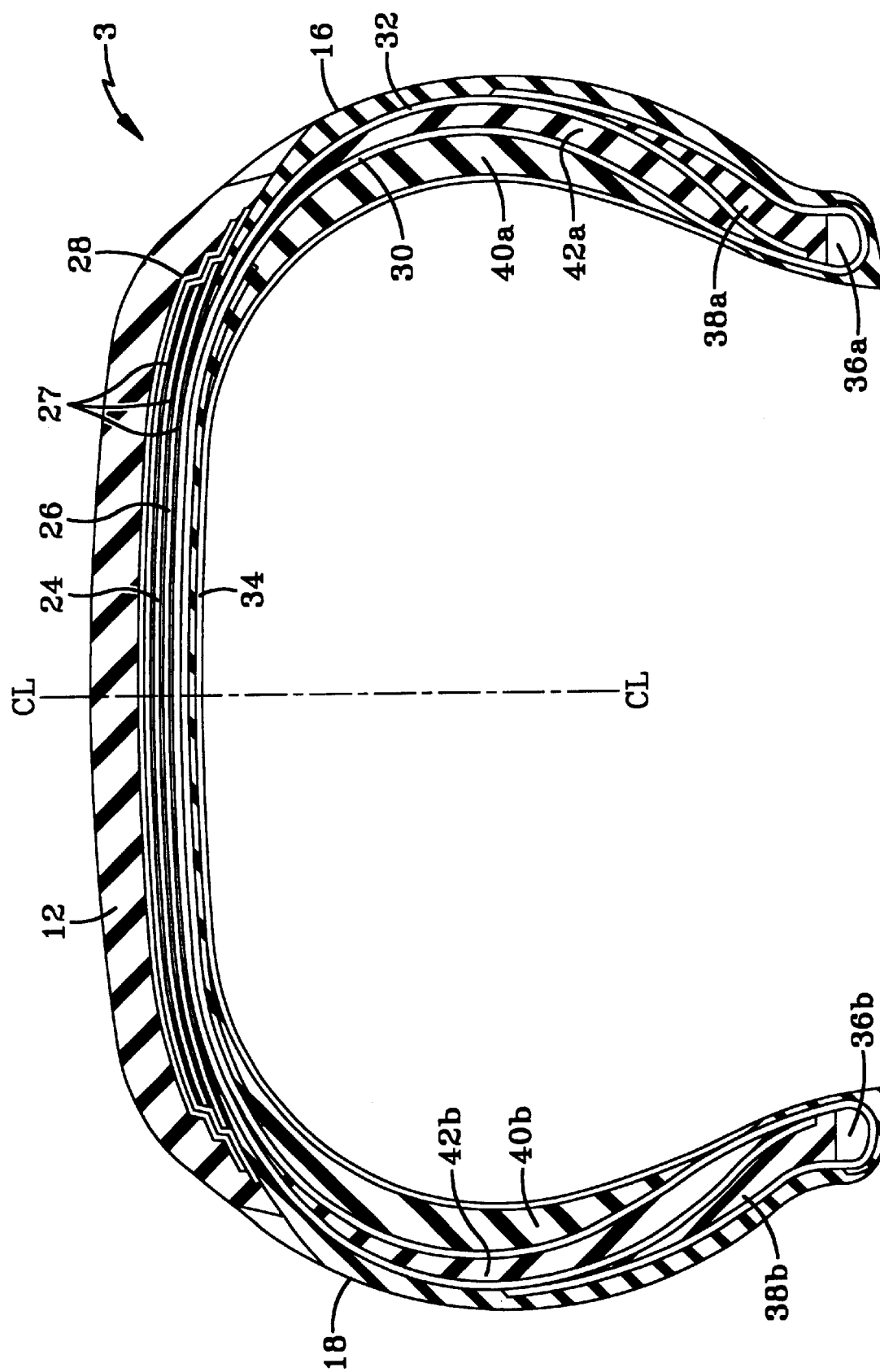
FIG. 7, is a third embodiment tire 3 having elastomeric spacer layers 27.

With reference to FIG. 7, a third embodiment tire 3 is shown. In tire 3 the tire has at least two layers of fabric overlay 28 as shown and two or more belt reinforcing layers 24,26. Radially inward of the fabric 28 overlay is an elastomeric layer 27, then a belt layer 24, another elastomeric layer 27, a belt layer 26, and a third additional elastomeric layer 27 and then the carcass reinforcing plies. Each elastomeric layer 27 provide a spacer between the fabric overlay 28, the belt layers 24, 26 and the carcass plies 30, 32 such that the composite structure is stiffened by a separation of each of these reinforcing layers. While it is believed that each layer 27 can be added separately, it is possible to provide the belt reinforcing layers with odd coats of material to establish at least one or more of the spacing elastomeric layers 27. An odd coat is where more rubber gauge is on one side of a layer or ply relative to the other side as measured from the cords.

Figure 8:
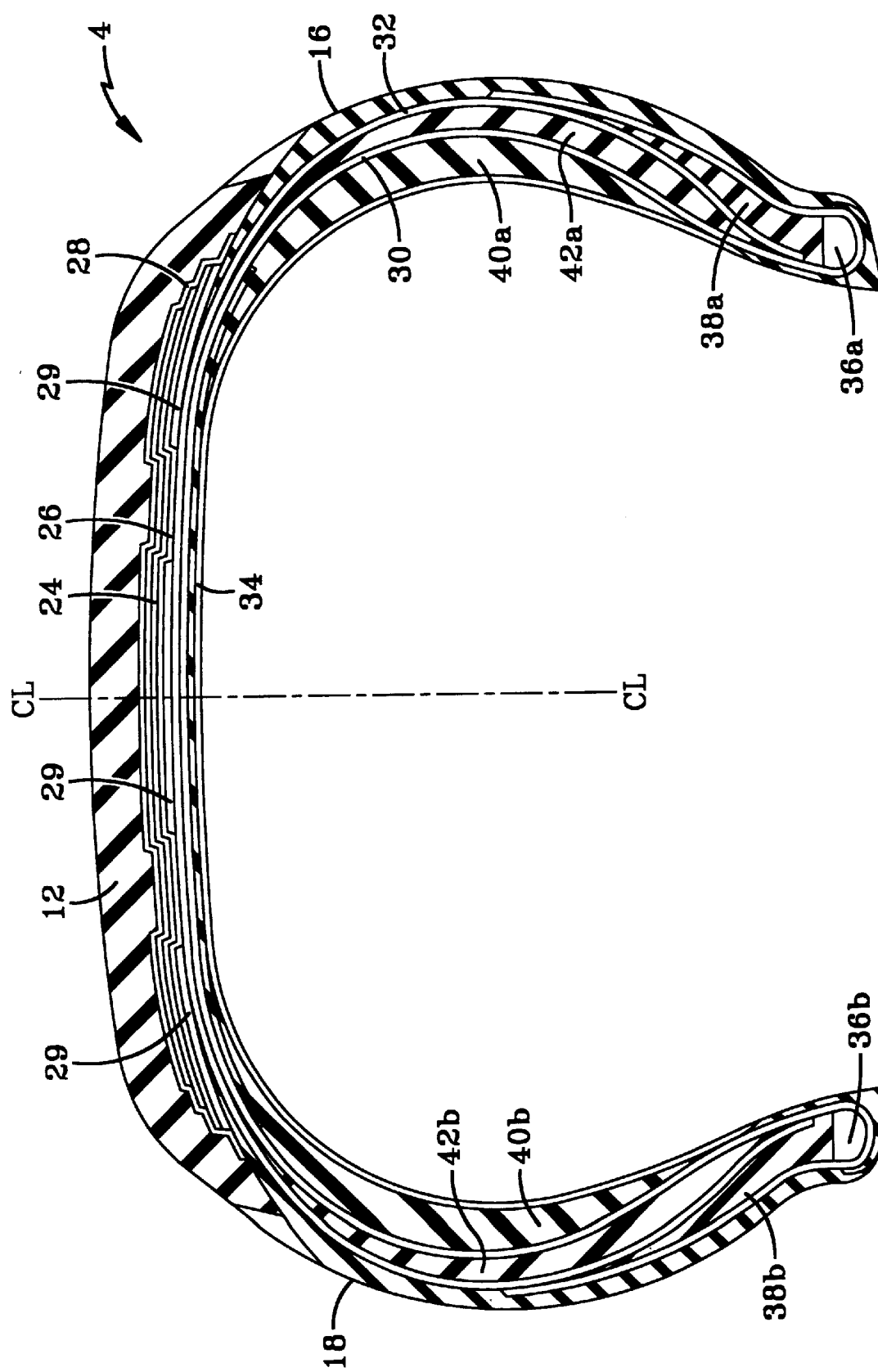
FIG. 8 is a cross-sectional view of a fourth embodiment tire 4 having three or more annular resilient bands 29.

With regard to FIG. 8 a fourth embodiment tire 4 is shown. The fourth embodiment tire 4 having three or more resilient bands 29 spaced radially inward and directly under the belt reinforcing layers 24, 26. The bands 29 are positioned in an array laterally across the tread and interposed between the belt reinforcing structure 24, 25 and the carcass ply 30, 32. The array of bands 29 have an axial width of at least 80 percent of the tread width. It is believed preferable that the bands be of a composite material, any composite material may be used, however, it is believed glass polyamide or carbon fiber are preferable. Each band 29 preferably should be extremely thin and result in minimum hoop distortion in the uninflated condition. Hoop distortion is a phenomenon that occurs with bands such that as the band rolls through the footprint, its deformation from circular to flat creates unusual rolling resistance increases. In order to avoid this phenomenon, it is important that the bands be sufficiently narrow and act independently of each other. Furthermore, it is believed essential that the bands be covered by at least the fabric overlay 28 or a belt reinforcing structure 24, 26.

Figure 9A:
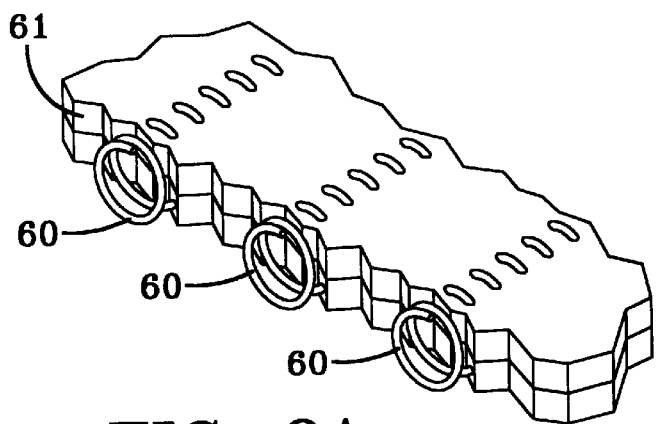
FIG. 9 and FIG. 9A show is a fifth embodiment tire 5 having a helically wound coil 60 located between the belt reinforcing structure and the carcass.
Figure 9:
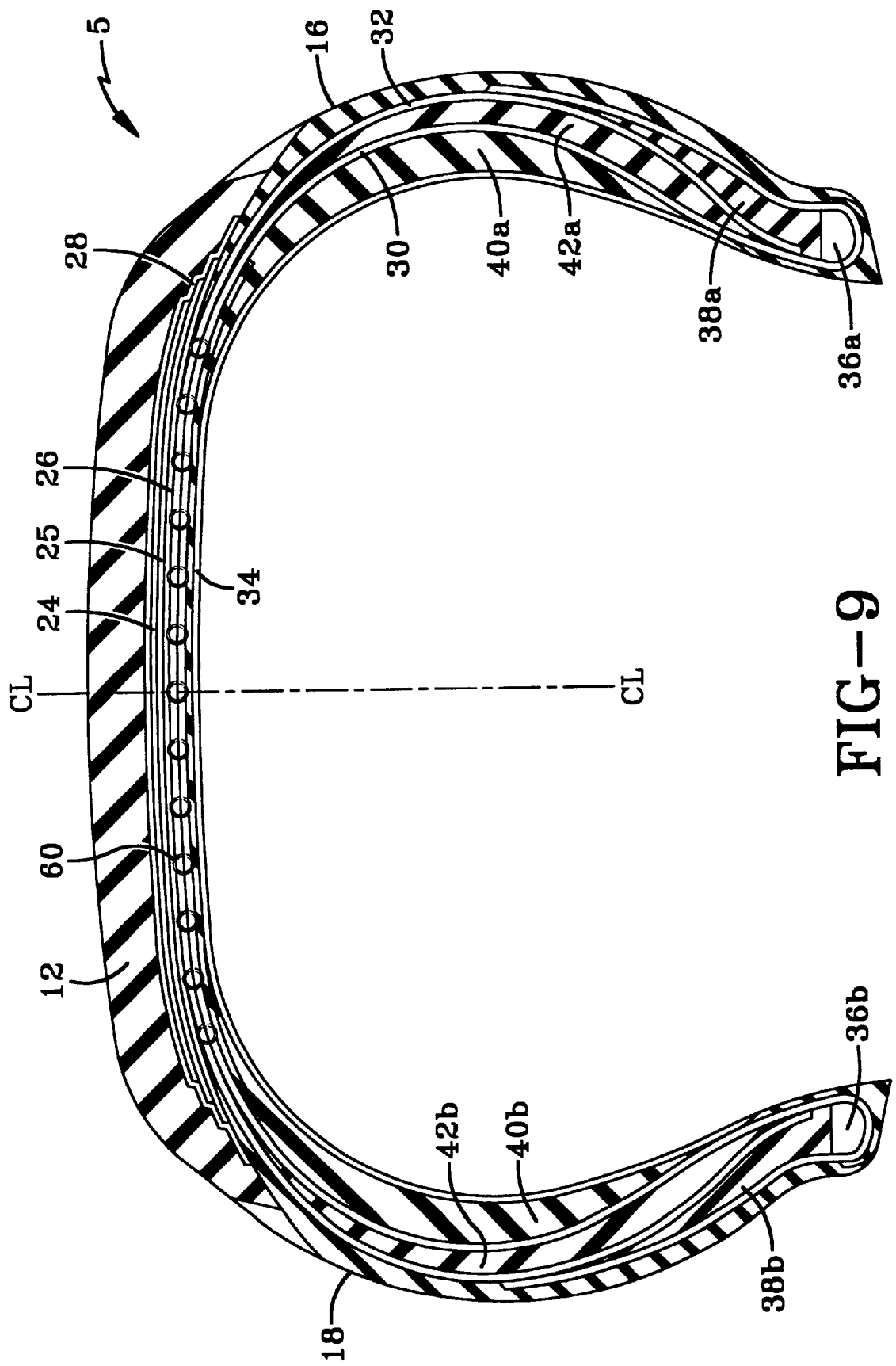

In FIG. 9, a runflat tire 5 is shown wherein one or more helically wound coils 60 extends axially across the radially inner belt reinforcing structure 14. As shown, the helically wound coils are interposed between the belt reinforcing structure 14 and the carcass ply 30, 32. As further illustrated, in FIG. 9A the helically wound coils 60 are encapsulated in the elastomeric material 61. Each coil 60 provides a stiffening in the circumferential direction and helps provide for the uninflated runflat condition while simultaneously being of a spring-like nature. These coils as the tire enters and leaves the footprint, provide minimal rolling resistance with exceptional tread stiffening capability.

Figure 10:
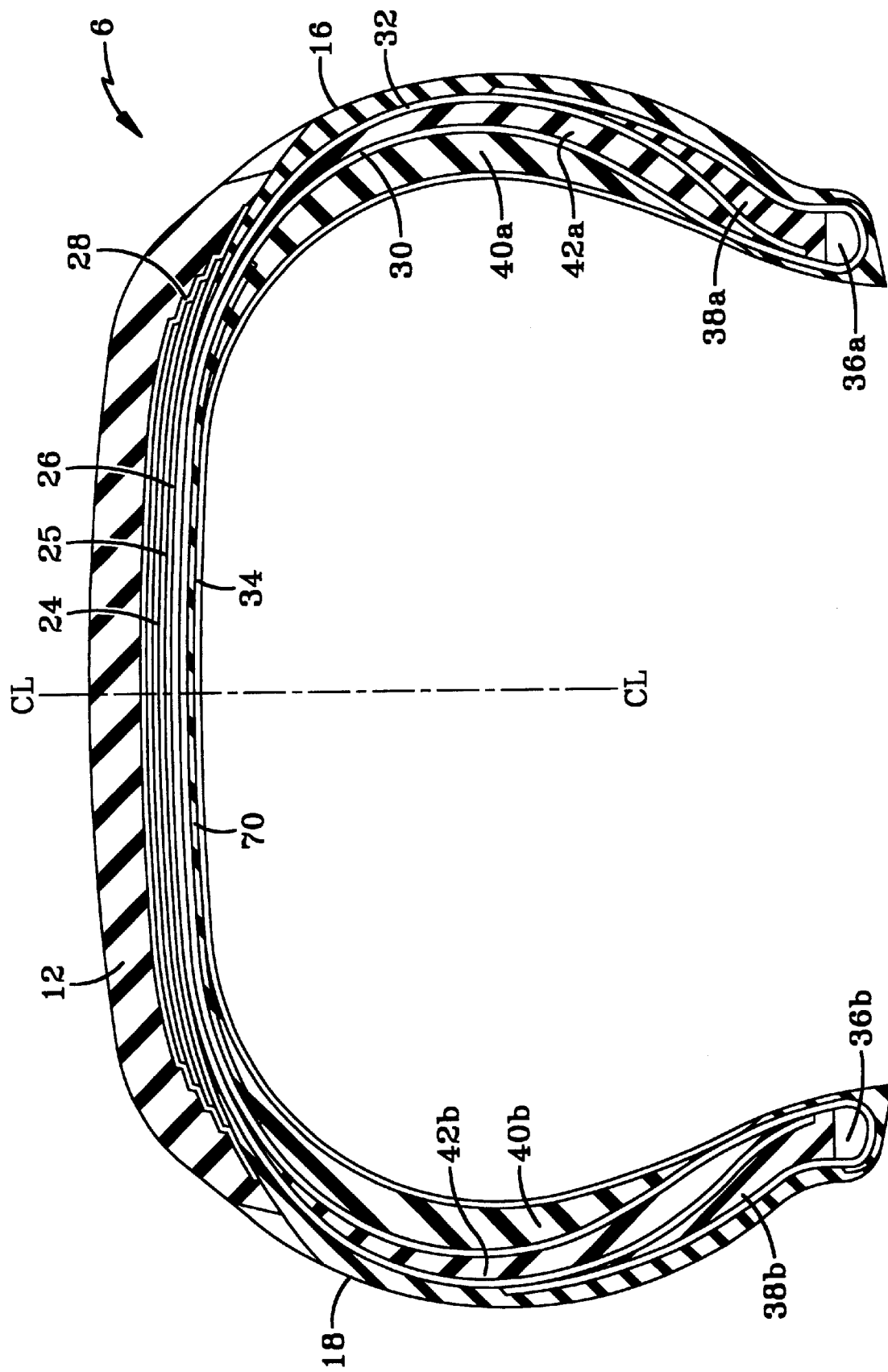
FIG. 10 is a sixth embodiment tire 6 having a fabric underlay 70 below the carcass plies 30, 32.

In FIG. 10 a sixth embodiment tire is shown. The tire 6 has an underply 70 lying radially inward of the carcass reinforcing structure 30, 32. The underply 70 can be a fabric reinforcement that lies between the innerliner 34 and the carcass ply 30 as shown in the figure. The underply 70 preferably has 90° aramid cords. Alternatively, the underply can be located between the belts and the plies and may be a spirally wound layer of 0° aramid cords. The underply 70 in combination with the tread, the overlay 28 and the belt reinforcing structure 14 provides a stiffening of the tread 12 of the tire 6 when the tire 6 is operated in the uninflated condition.

Each of the tires as shown provide a composite structure that yields the contact patch 55 at normal inflation and zero PSI whereby the tread elements maintain at least parimeter contact around the contact patch 55 along the shoulders 50, 52 and leading edge 54, preferably along both the leading edge 54 and trailing edges 56. It is believed that these combinations provide improved driving handling in the uninflated condition. The various charts and tables following are examples of several of the embodiments that were tested under the various conditions mentioned below.

A series of tests were conducted using a P215/65R15 tire size in a variety a constructions. Test tire 1A being the tire 1 of FIG. 5, the first embodiment tire. That tire had inserts 40, 42 of a maximum thickness of 8 mm, 7 mm, respectively and 3 layers of spirally wound overlays 28. The apex 38a, 38b extended 2.5 inches or about 6.4 cm above the bead core. The same tire 1 but with inserts 40, 42 having a maximum thickness of only 6.5 mm, 6.5 respectively and an apex extending about 2 inches above the bead was tested as tire 1B. Tire 1B had less robust sidewalls in both load supporting capacity and weight, the tire 1B weighing about 16.7 Kg while tire 1A weighed 17.8 Kg.

Test tire 2A was the second embodiment tire 2 of FIG. 6 having 3 belts with UW17 cords oriented at 24° relative to the equatorial plane and 2 layers of aramid cords reinforced overlays.

Test tire 2B had three belts with WL24 cords at 24°. Test tire 2C had three belts with WL24 cords (one belt adjacent to the carcass having 80° cords, the other two belts having 24° cords).

Test tire 3 was the tire 3 of FIG. 7 employing one full width elastomeric spacer 27 between the belt structure 14 and the carcass ply 30, 32.

Test tire 6A employed an underlay 70 of spiral wound substantially 0° aramid under the first belt 24, test tire 6B had a 90° aramid underply 70, both tires 6A and 6B being otherwise as shown and described of FIG. 10 embodiment tire 6.

The charts of FIGS. 11, 12, and 13 shows the deflection versus cornering coefficient cc at 4000 N (normal vehicle load) at 32 psi inflation, at 0 psi inflation and the change in deflection versus change in cornering coefficient at 32 psi versus 0 psi respectively.

While all the tires tested are remarkably good, one of ordinary skill in the art will readily appreciate that the ability to adjust the tread stiffness as a composite structure of all the underlying components is readily achievable.

Four of the test tires and one modified 1B' having a 2.5 inch apex 38a, 38b were then run on a track to rank the normally vehicle loaded tires zero psi handling and the maximum gross vehicle weight load at zero psi handling the results are found in column 1 and 2 of the chart A below. In columns 3 through 5, the subjective test of impact damping was tested at 32 psi normal vehicle load on a scale of 1 to 6, 6 being the best and closest to a conventional pneumatic tire without runflat capability.

CHART A

| Test Tire | 1<br>0 psi 4000<br>Newton Load | 2<br>0 psi<br>5600<br>Newton<br>Load | 3<br>Initial<br>Impact | 4<br>Damping | 5<br>Impact<br>Boom |
|---|---|---|---|---|---|
| 1A | 2 | 1 | 6.00 | 6.00 | 5.75 |
| 1B' | 1 | 4 | 5.75 | 5.75 | 5.50 |
| 1B | 5 | 5 | 5.75 | 6.00 | 5.75 |
| 2A | 4 | 3 | 5.75 | 5.75 | 5.75 |
| 3 | 3 | 2 | 5.50 | 5.75 | 5.75 |

The results of the test verify that the tread stiffening member 101 and controlled deflections provides a runflat tire that is comparable to a conventional pneumatic tire at normal inflation but also is superior to prior art runflat tires at zero psi handling conditions.

What is claimed is:

1. A pneumatic runflat tire having a radially outer tread, a belt reinforcing structure radially inward of the tread, the belt reinforcing structure having at least two cord reinforced layers, and a carcass reinforcing structure including at least one cord reinforced ply extending to a pair of annular bead cores, the tire when mounted on a design rim and normally inflated but unloaded has a section height H and a section width W, wherein W is greater than H, the tire having H being greater than 4 inches (10 cm) and the ratio of H/W defines the aspect ratio of the tire, the aspect ratio being greater than 50%;

a pair of sidewalls extending from the tread radially inward toward the bead cores, each sidewall having two runflat elastomeric inserts, at least one elastomeric insert radially inward the at least one carcass ply, the inserts having a maximum thickness of 8 mm and 7 mm, respectively, a tread stiffening member in combination with the sidewalls, tread and the other underlying composite reinforcements, exhibiting a deflection profile of the tire, wherein the normally inflated 30 psi deflection $D_{30}$ of the tire under normal load is less than 20 mm and the 0 psi deflection $D_0$ under normal load is less than 40 mm and the difference between the normally loaded and inflated deflection $D_{30}$ and the $D_0$ deflection is substantially equal to or less than the amount of deflection $D_{30}$.

2. The pneumatic runflat tire of claim 1 further characterized by:

a fabric overlay interposed between the tread and the belt reinforcing structure being made of three or more spirally wound layers of aramid cord reinforced strips, the cords being oriented at an angle θ of less than 5° relative to an equatorial plane of the tire, the fabric overlay being the tread stiffening member.

3. The pneumatic runflat tire of claim 2 wherein the strips are spirally wound about the tire, each spiral revolution having a pitch of 25 mm or less, the strips overlapping sufficiently to create at least three layers of overlay fabric across the entire width of the underlying at least two belt layers.

4. The pneumatic runflat tire of claim 1 wherein the belt reinforcing structure has three belt layers, each belt layer having parallel cords oriented angularly relative to the equatorial plane of the tire in the range of 18° to 30° and each adjacent layer being oppositely inclined, the third belt layer being the tread stiffeneing member.

5. The pneumatic runflat tire claim 4 wherein each adjacent belt layer has cords angles equal but oppositely inclined.

6. The pneumatic runflat tire of claim 4 wherein the cords of one or more belt layers are steel and have a diameter of 0.035 inch and a 2+2 construction.

7. The pneumatic runflat tire of claim 4 wherein the cords of one or more belt layers steel having a 0.056 inch cord diameter.

8. The pneumatic runflat tire of claim 4 further being characterized by a fabric overlay, the overlay being 2 layers of aramid reinforcing cord.

9. The pneumatic runflat tire of claim 1 further characterized by three or more annular resilient bands located laterally across and radially inward of the tread and belt reinforcing structure, the bands being the tread stiffening member.

10. The pneumatic runflat tire of claim 1 further characterized by a plurality of helically wound coils extending circumferentially around and radially inward of the belt reinforcing structure.

11. The pneumatic runflat tire of claim 1 further characterized by a fabric underply layer lying radially inward of the carcass reinforcing structure, the underply being the tread stiffening member.

12. The pneumatic runflat tire of claim 1 further characterized by a fabric underply layer located between the belt reinforcing structure and the carcass plies, the fabric underply being the tread stiffening member.

13. The pneumatic runflat tire of claim 1 further characterized by an apex on each bead core, the apex extending about 2.5 inches (6.4 cm) above the bead core.

14. The pneumatic runflat tire of claim 1 wherein the tire when mounted on a design rim has a dynamic tread contact patch at 4 km/hr characterized by:

a substantially rectangular shape having a width $W_m$ and an average circumferential length $L_n$ as measured between a leading edge and a trailing edge when under normal vehicle load and normal inflation pressure and a length $L_n+\Delta L$ and a width $W_n$, when under normal vehicle load and zero inflation pressure defining the perimeter shape of the contact patch wherein the leading edge maintains tread element contact in the range of inflation pressures from 0 psi to normal inflation pressure.

15. The pneumatic runflat tire of claim 14 wherein the ratio of the contact patch length $L_n+\Delta L$ at 0 psi to the length $L_n$ is 225 percent or less.

16. The pneumatic runflat tire of claim 14 wherein the tire has a net contact area when normally loaded and inflated that is less than 150 percent of the normally loaded and zero PSI net contact area.

17. The pneumatic runflat tire of claim 14 wherein the combination of the tread, the belt reinforcing structure, the at least one cord reinforced carcass ply and the tread stiffening member selected from one or more of (a) a fabric overlay having at least three layers of cord reinforced material, located between the tread and the belt reinforcing structure, (b) three or more annular bands positioned in an array laterally across the tire interposed between the belt reinforcing structure and the at least one carcass ply, the array of bands having an axial width at least 80 percent of the tread width, (c) one or more layers of elastomeric spacers, one layer located between two belt layers or a belt layer and the carcass, (d) a third belt layer having steel cords inclined in the range of 18° to 30° relative to the equatorial plane, (e) a third belt layer having cords in the 50° to 80° range relative to the equatorial plane and located between the belt reinforcing structure and the carcass, (f) one or more fabric underply layers located between the belt reinforcing structure and the carcass reinforcing structure, (g) one or more helically wound coils extending axially across and radially inward of the belt reinforcing structure, forming a composite structure yielding the contact patch at normal vehicle load and zero psi whereby the tread elements maintain at least perimeter contact around the contact patch along the leading edge and both shoulder regions of the contact patch.

* * * * *

UNITED STATES PATENT AND TRADEMARK OFFICE
CERTIFICATE OF CORRECTION

PATENT NO.     : 6,439,283 B1
DATED          : August 27, 2002
INVENTOR(S)    : Paonessa et al.

It is certified that error appears in the above-identified patent and that said Letters Patent is hereby corrected as shown below:

<u>Title page,</u>
Item [75], the inventor's name, "Steven Craig Roweder", is incorrectly spelled, correct the spelling to be -- Steven Craig Rohweder --.

Signed and Sealed this

Eighteenth Day of February, 2003

JAMES E. ROGAN
*Director of the United States Patent and Trademark Office*